July 12, 1966   J. L. JEANNERET   3,259,960
CUTTING TOOL APPARATUS
Filed Sept. 23, 1963   2 Sheets-Sheet 1
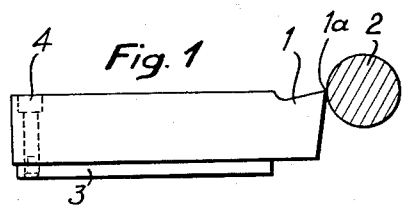
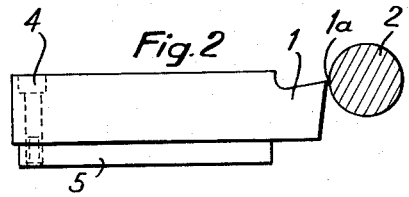
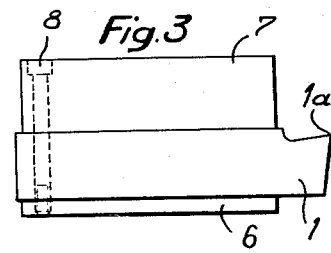
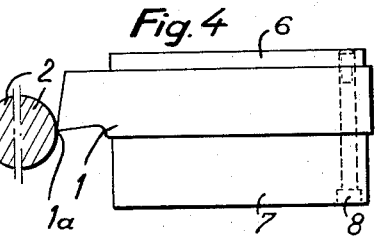
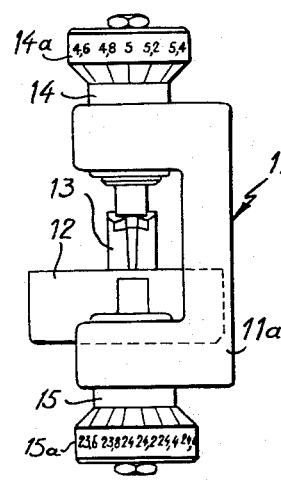
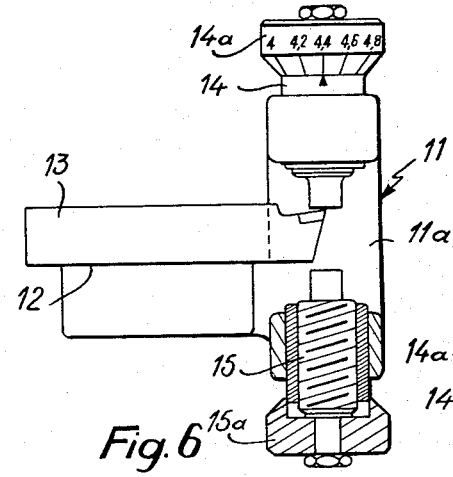
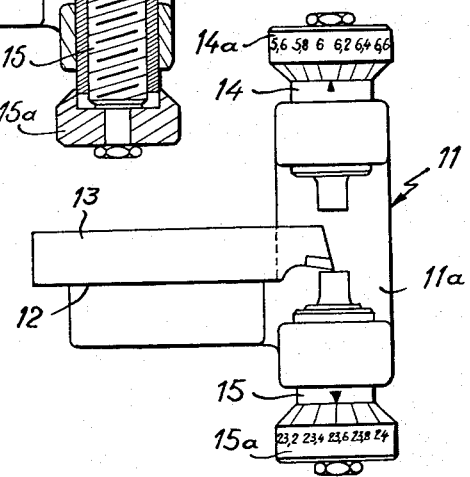

3,259,960
CUTTING TOOL APPARATUS
Jules Louis Jeanneret, 13–21 Rue Henri-Gelin,
Niort (Deux-Sevres), France
Filed Sept. 23, 1963, Ser. No. 310,804
Claims priority, application France, Sept. 25, 1962,
910,382
4 Claims. (Cl. 29—96)

This invention relates to cutting tool apparatus for machines tools, particularly lathes and its general objective is to facilitate and expedite the presetting and adjusting operations involved in mounting a cutting tool on such machines for a given cutting operation.

In a lathe, the cutting tool must be positioned with its cutting edge lying on the horizontal diametric plane of the workpiece if turning operations are to proceed satisfactorily. Since the exact location of the cutting edge of the tool in relation to the base surface of the tool is essentially variable, being determined by any grinding operations to which the tool may have been subjected, it is customary to interpose spacer shims between one, or each, of the base surfaces of the tool and the related surface of the tool carrier and so selected as to bring the cutting edge of the tool to the requisite elevation as determined by the aforementioned horizontal diametric plane extending through the axis of the work. The selection of the appropriate shims and their insertion and removal into and from the tool carrier as currently performed are relatively long and tedious operations which it is an object of this invention to facilitate or eliminate.

Thus, when a tool is to be removed from its carrier after one cutting step for the performance of a different cutting operation, say for cutting a chamfer after an annular groove has been cut in the work, the shims which were used in the preceding cutting step are removed and put aside. When thereafter the tool is to be reused for the initial cutting step, assuming the tool is not in need of being sharpened, then the initially used shims must be sought out again and reinserted. The present invention makes this tedious operation unnecessary.

Similarly, when the cutting edge of the tool must be resharpened or ground, the shim or shims previously used for locating the tool in its proper position within the tool carrier must be replaced by another shim or pair of shims of different thickness. Determining the correct thickness of the shims to be used, as this determination is currently performed, is quite delicate and requires considerable skill on the part of the operator. This invention, according to an important object, renders this determination simple and quick to perform even by unskilled operators.

According to an aspect of the invention an improved cutting tool assembly for a lathe-type machine-tool comprises in combination a cutting tool body, at least one shim element, and means for removably securing the shim element to a related base surface of the tool body. The thickness of the shim element is so predetermined that the cutting edge of the tool when mounted in the tool carrier of the machine-tool will accurately coincide with the horizontal diametric plane passing through the axis of rotation of the work-carrier spindle of the machine-tool.

It is also an object of the invention to provide an improved jig for predetermining the thickness of shim elements to be used in conjunction with a cutting tool of a lathe-type machine-tool. A jig according to the invention essentially comprises a frame having a supporting table whose surface is engageable by one of the base surfaces of the cutting tool body, and a pair of micrometer screws threadedly mounted in the frame with their axes aligned on a direction normal to the plane of said table, each of said screws being operable for successive engagement with the cutting edge of the tool positioned on said table first with one, then with the other of its base surfaces engaging the table surface. The geometric dimensions of the jig and the calibrations of the micrometer screws are predetermined so that on each of said screws being brought into engagement with the cutting edge, the calibration of the screw will indicate the thickness of the shim to be inserted on a related side of the tool within the tool carrier with which it is to be used.

A further object of the invention is to provide an improved cutting tool assembly for a lathe-type machine-tool including one or preferably more cutting tools together with removably incorporated spacer shims. An object is to provide such an assembly which will be reversible so as to make it possible to engage the cutting edge of the, or each, tool thereof upwardly or downwardly with the work, without such reversal requiring readjustment or shim replacement. A further object is to provide in association with an improved cutting tool assembly for a lathe-type machine tool, having shim means removably incorporated therein, means for cancelling the reaction force produced during cutting operations on the tool carrier.

The various objects and features of the invention will be made clear from the ensuing description of exemplary embodiments thereof selected by way of illustration but not of limitation with reference to the accompanying drawings, wherein:

FIG. 1 is a schematic view, on a plane normal to the lateh spindle axis, of a simple cutting tool assembly having a shim element removably associated therewith;

FIG. 2 is a similar view after the tool of FIG. 1 has been subjected to a grinding operation;

Figures 8, 9:
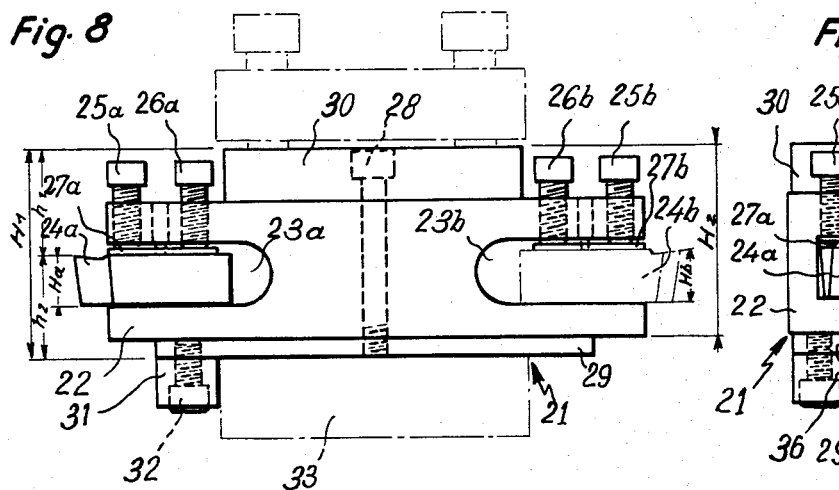
Figure 10:
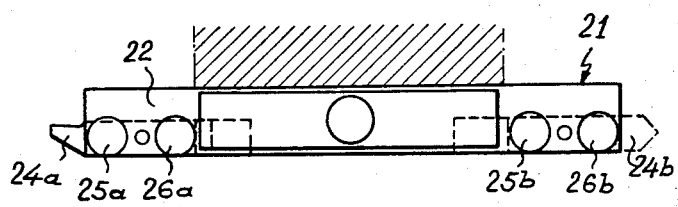

FIG. 3 similarly shows a cutting tool assembly having two incorporated shims;

FIG. 4 is a similar view with the tool reversed;

FIG. 5 is a front elevation of a jig according to the invention for rapidly determining shim thickness;

FIG. 6 is a corresponding side view with the tool positioned for determining the thickness of one of the shims to be used therewith;

FIG. 7 is similar to FIG. 6 but shows the tool positioned for determining the thickness of the other shim;

FIG. 8 is a side view of one embodiment of an improved cutting tool assembly according to the invention embodying two cutting tools and removably incorporated shims associated therewith;

FIG. 9 is a corresponding end view from the left of FIG. 8;

FIG. 10 is a corresponding view in plan; and

Figure 11:
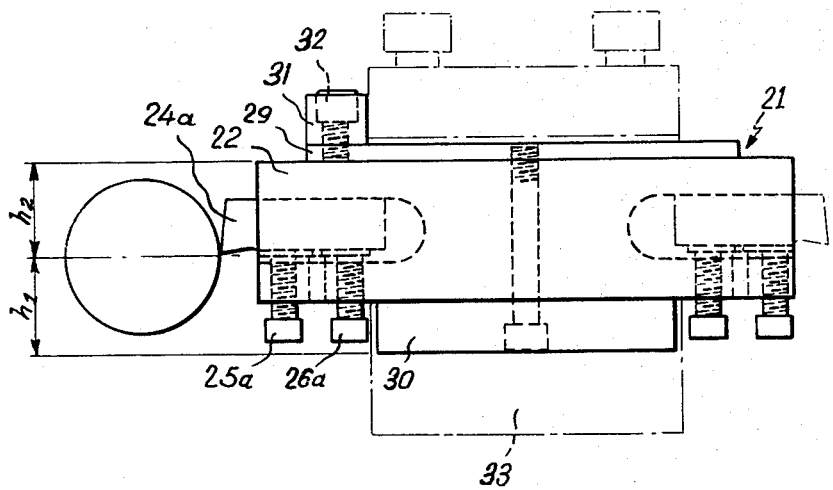

FIG. 11 is a view similar to FIG. 8 but showing the tool assembly mounted in reversed condition in the tool carrier.

Referring to FIG. 1, the invention in its simplest form provides a cutting tool assembly including a cutting tool body or bit 1 of the conventional shape used with lathes and the like, including a cutting edge 1a, and a shim element 3 removably assembled to one (herein the lower) base surface of the cutting tool bit by means of a screw 4 having a countersunk head extending through a suitable countersunk bore formed through body 1 and engaging a threaded hole at one end of shim 3. It will be understood that the "base surfaces" of the tool, as this expression is used in the specification and claims, refer to the generally flat parallel, opposed surfaces of the tool bit which are normally adapted to be clamped in the usual tool carrier. In use, the thickness of the shim element 3 is so selected that the cutting edge 1a is located on the horizontal diametric plane of a workpiece schematically indicated at 2. In FIG. 2, it is assumed that the tool bit 1 has been subjected to a grinding step so that its cutting edge 1a has been somewhat depressed in relation to one base surface of tool body 1. Accordingly, shim 3 of FIG. 1 has now been replaced by a shim 5 of greater thickness so predetermined that cutting edge 1a is again located on the horizontal diametric plane of the workpiece. Means according to the invention for rapidly and easily effecting such determination of shim thickness will be described presently in relation to FIGS. 5–7.

In FIG. 3 is shown a modified tool assembly wherein the tool body of bit 1 has removably associated with it two shims 6 and 7 respectively mounted on its opposite base surfaces by means of a screw 8 having a countersunk head and extending through aligned bores in upper shim 7, tool body 1 and engaging a threaded hole in lower shim 6. The countersunk head of the screw is received in an enlargement of the bore provided through the thicker, herein upper, shim 7. FIG. 4 illustrates the same assembly reversed in its tool carrier (not shown) so that the cutting edge 1a of the tool is now directed to engage the work 2 downwardly rather than upward as in FIG. 3. Since the sum of the thicknesses of both shims such as 6 and 7 plus the thickness of tool body 1 is a constant, for a given tool carrier, it will be evident that after a tool grinding operation the individual thickness of such shim will vary but the sum of both shim thicknesses will remain unchanged. This fact, as will be more clearly understood from a later part of the specification, makes it possible simply to reverse the entire tool assembly provided with the two opposite removably incorporated shim elements 6 and 7, from the position of FIG. 3 to the position of FIG. 4, while still retaining the desired engagement of the cutting edge with the horizontal diametric plane of the work.

FIGS. 5 to 7 illustrate a jig assembly provided according to the invention for easily determining the requisite shim thicknesses, say after a tool grinding step. The jig generally designated 11 comprises a frame 11a and a supporting table 12 having a flat top on which either of the flat base surfaces of a tool body, herein designated 13, can be positioned. A pair of micrometer screws 14 and 15 are mounted in the frame 11a on a common axis normal to the surface of table 12, and with the tips of the screws facing inwards. For determining the thickness of the lower shim 6 of FIG. 3, the tool body 13 is placed on table 12 with its cutting edge directed upwards (as in FIG. 5) and the upper micrometer screw 14 is operated until its tip engages the cutting edge. It can easily be shown that since the constant over-all thickness dimension of the tool-and-shim assembly of FIG. 3, and the constant thickness of the tool body, are known, the micrometer scale 14a can be so calibrated in units of shim thickness that in the position shown in FIG. 6 with the tip of upper screw 14 engaging the tool cutting edge, the scale 14a will indicate the requisite thickness of shim 6 necessary to locate edge 1a on a level with the horizontal plane of the work axis. Similarly, when the tool body 13 is placed in inverted condition on table 12 as in FIG. 7, and the lower micrometer screw 15 is operated to engage the cutting edge of the bit, the associated lower micrometer scale 15a can indicate there requisite thickness of the opposite shim element 7, i.e. the shim element adjacent the cutting edge of the tool.

While the simple cutting tool assembly shown in FIG. 1 or FIG. 3 and described above already provides important advantages over the conventional arrangement in which the tool bit and shims are separate, the teachings of the invention can be most fully taken advantage of through the use of the more elaborate cutting tool assembly shown in FIGS. 8–11. In this embodiment, the tool assembly generally designated 21 comprises a generally rectangular elongated support member 22 having recesses 23a, 23b formed in one side of it and extending from the opposite ends of the member 22 towards each other. With each recess is associated a pair of blocking screws 25a–26a, and 25b–26b respectively, screwed into threaded holes formed through member 22 and projecting into the respective recesses, so as to block therein a tool bit, respectively 24a and 24b, together with an associated shim element such as 27a and 27b. The cutting edge of the tool bit 24a, 24b projects outwardly of the related recess 23a, 23b beyond the corresponding end of supporting member 22. Further, a pair of spacer shims 29 and 30 are adapted to be assembled to the upper and lower outer base surfaces of the supporting member 22, respectively, by means of a common screw 28 having a countersunk head received in the upper shim 30 said screw extending through aligned passages in shim 30 and member 22 and having its end screwing into a threaded hole in shim 29. An abutment block 31 is associated with the base surface of the assembly on the side thereof opposite from that towards which cutting edge of the tool used, such as 24a, is directed, i.e. the under side of FIG. 8. Block 31 is shown secured to the outer surface of the related shim 29 by means of a screw such as 32. Block 31 is positioned so that its inner side surface will abut an adjacent side surface of tool carrier 33 (shown in dotted outline) when the assembly is mounted in the tool carrier.

In use, the dual-bit assembly described is clamped in a conventional tool carrier such as 33 by means of the usual clamping screws as shown, with a selected one of the bits 24a, 24b projecting towards the work. The assembly may be positioned either in the condition shown in FIG. 8 with the cutting edge of the bit directed upwards, or in the inverted position shown in FIG. 11 with the cutting edge directed downwards. During a cutting operation, the reaction force applied by the work against the cutting edge of the operative tool bit tends to exert a bending moment on the projecting part of bit 24 and member 22, but this moment is effectively taken up and counteracted by the engagement of the side of abutment block 31 with the tool carrier 33 as will be apparent from FIGS. 8 and 11.

Preferably the recesses 23a and 23b are so formed that the surfaces thereof which are to receive the lower base surface of the tool bit 24a or 24b thereon, i.e. that base surface of the tool body directed away from the cutting edge of the bit, are accurately positioned in respect to the height dimension of the member 22, so as to locate the tool bits at such an elevation in said member that when the shim 30 equals in thickness the thickness $Ha$ (or $Hb$) of the body of bit 24a (or 24b), then the cutting edges of the bits are positioned on the requisite horizontal plane passing through the work axis. With such an arrangement the correct thickness to be selected for shim 30 is immediately ascertainable as the elevation $Ha$ (or $Hb$) of the cutting edge over the locating base surface of the bit. The thickness selected for the opposite shim 29 is the difference between the known over-all dimension $H1$ and the dimension $H2$ which is the combined thickness of supporting member 22 and shim 30, likewise known. When both outer shims 29 and 30 have thus been selected as just described, it will be evident that the distance $h1$ from the cutting edge to one of the outer base surfaces of the assembly is equal to the distance $h2$ from said cutting edge of the other of said base surfaces. This makes it possible to invert the entire assembly bodily within the tool carrier, as shown in FIG. 11, so that the tool will now attack the work downwardly rather than upwardly, and the cutting edge will still be properly positioned on the horizontal diametric plane of the work.

It will be apparent that various modifications other than those shown may be conceived without exceeding the scope of the invention. Thus, a tool assembly of the general type shown in FIGS. 8–11 may be constructed to support only a single cutting tool or bit instead of the two shown, or alternatively it may be constructed to support more than two cutting tools.

What I claim is:

1. A cutting tool assembly adapted for being inserted into a tool carrier of a lathe-type machine tool, said assembly comprising a cutting tool having opposite parallel base surfaces, a shim on each of said base surfaces, and means detachably connecting the shims to said base surfaces such that the shims and cutting tool constitute a unit assembly, the sum of the thicknesses of both shims and the cutting tool being constant, the thickness of the shim engaging the tool base surface opposed to the cutting edge thereof being such that said cutting edge is located on the horizontal diametric plane of the work-piece, while the thickness of the opposite shim is equal to the vertical distance between the cutting edge and that base surface of said tool opposed to said cutting edge.

2. A cutting tool assembly adapted for being inserted into a tool carrier of a lathe-type machine tool, said assembly comprising a support member having opposite parallel base surfaces, said support member having opposite ends with a recess at least in one of these ends, a cutting tool in said recess and projecting therefrom, means detachably securing the cutting tool in said recess, a shim on each of the base surfaces of the support member, and means detachably securing the shims to the base surfaces whereby the support member, tools and shims form a unit assembly, the sum of the thickness of both shims and of the support member being constant, the thickness of the shim secured to the support member on the base surface positioned on the same side as the tool cutting edge being equal in thickness to the vertical distance between said cutting edge and that base surface of said cutting tool which is remote from said cutting edge, said recess being so formed so that the surface thereof which is to receive that base surface of the cutting tool remote from the cutting edge of said cutting tool is accurately positioned with respect to the height dimension of said support member, to locate the cutting tool at such an elevation in said support member that said cutting edge is located on the median horizontal plane of said unit assembly.

3. A cutting tool assembly as claimed in claim 2, wherein there are two inwardly directed recesses at opposite ends of said support member for receiving respective tool bodies therein with their cutting edges projecting in opposite directions.

4. An assembly as claimed in claim 2, including an abutment block associated with the shim secured to the base surface of said support member opposed to said tool cutting edge, and projecting from said shim and having a portion adapted for being positioned in force-transmitting relation with a cooperating surface portion of the tool carrier of said machine tool.

References Cited by the Examiner

UNITED STATES PATENTS

| 2,171,694 | 9/1939 | Harje | 29—96 |
| 2,296,597 | 9/1942 | Carr | 29—96 |
| 2,348,530 | 5/1944 | Driotiour | 33—185 |
| 2,375,448 | 5/1945 | Talbot | 33—185 |
| 2,390,967 | 12/1945 | Swenson | 29—96 X |
| 2,487,209 | 11/1949 | Anthony | 29—96 |
| 2,659,962 | 11/1953 | Doerseln | 29—96 |
| 2,734,256 | 2/1956 | Forward | 29—96 |

FOREIGN PATENTS

| 551,281 | 1/1923 | France. |
| 2,072 | 1/1899 | Great Britain. |
| 9,981 | 5/1900 | Great Britain. |
| 783,039 | 9/1957 | Great Britain. |

WILLIAM W. DYER, Jr., *Primary Examiner.*

HARRISON L. HINSON, *Examiner.*